(No Model.) 4 Sheets—Sheet 1.
G. WESTINGHOUSE, Jr. & E. RUUD.
MEANS FOR CONTROLLING AND REGULATING OPERATION OF GAS ENGINES.
No. 583,585. Patented June 1, 1897.
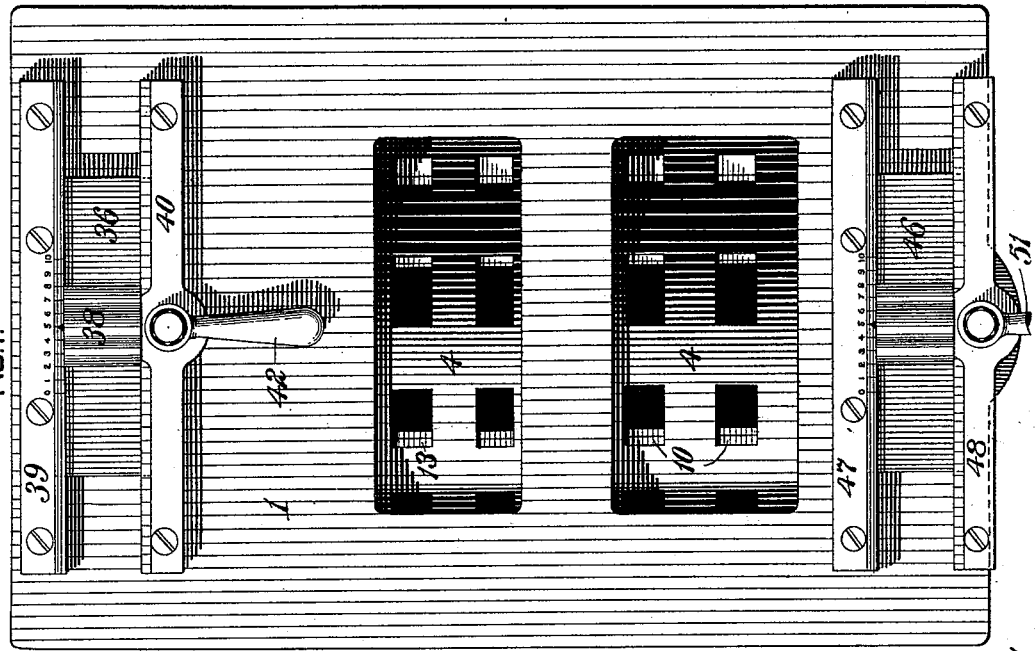
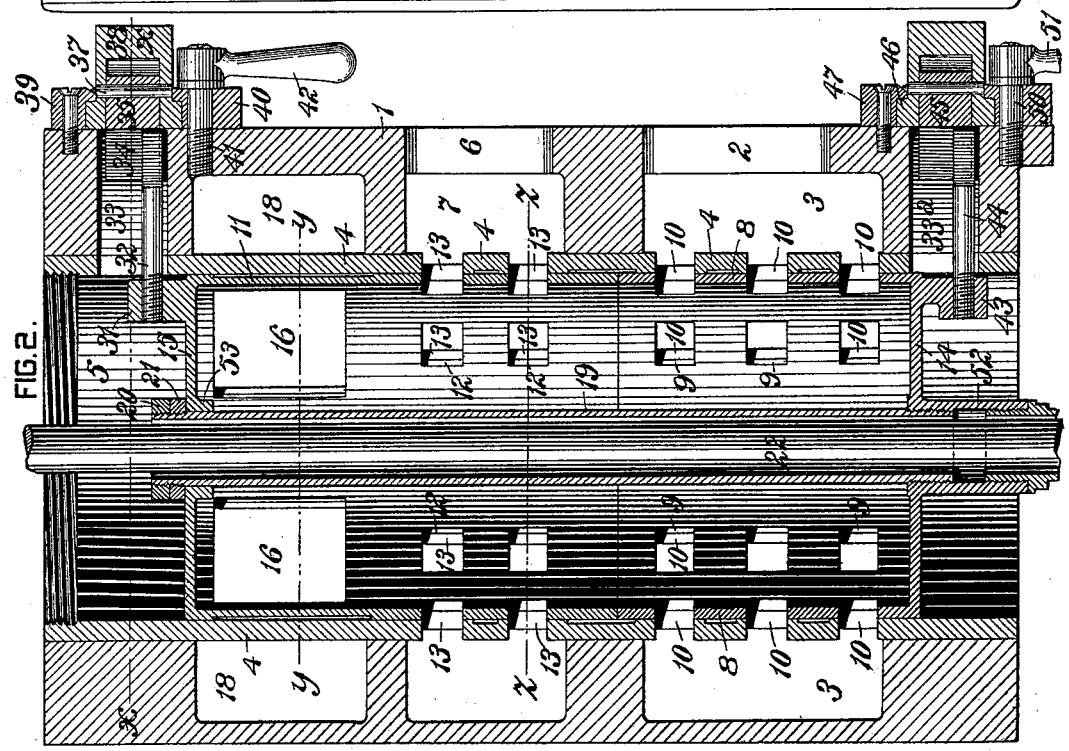
WITNESSES:
Chas. F. Miller.
T. J. Hogan.
INVENTORS
G. Westinghouse Jr.
Edwin Ruud,
by J. Morrden Bell,
Att'y.

(No Model.) 4 Sheets—Sheet 2.

G. WESTINGHOUSE, Jr. & E. RUUD.
MEANS FOR CONTROLLING AND REGULATING OPERATION OF GAS ENGINES.

No. 583,585. Patented June 1, 1897.

WITNESSES:
Chas. F. Miller.
T. J. Hogan.

INVENTORS.
Geo. Westinghouse Jr
Edwin Ruud,
by Howden Bell,
Att'y.

(No Model.) 4 Sheets—Sheet 3.
G. WESTINGHOUSE, Jr. & E. RUUD.
MEANS FOR CONTROLLING AND REGULATING OPERATION OF GAS ENGINES.
No. 583,585. Patented June 1, 1897.
FIG. 6.
FIG. 7.
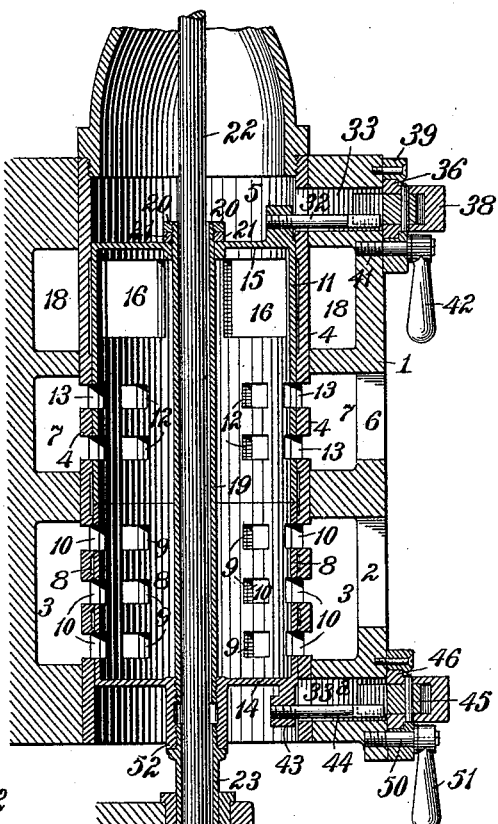
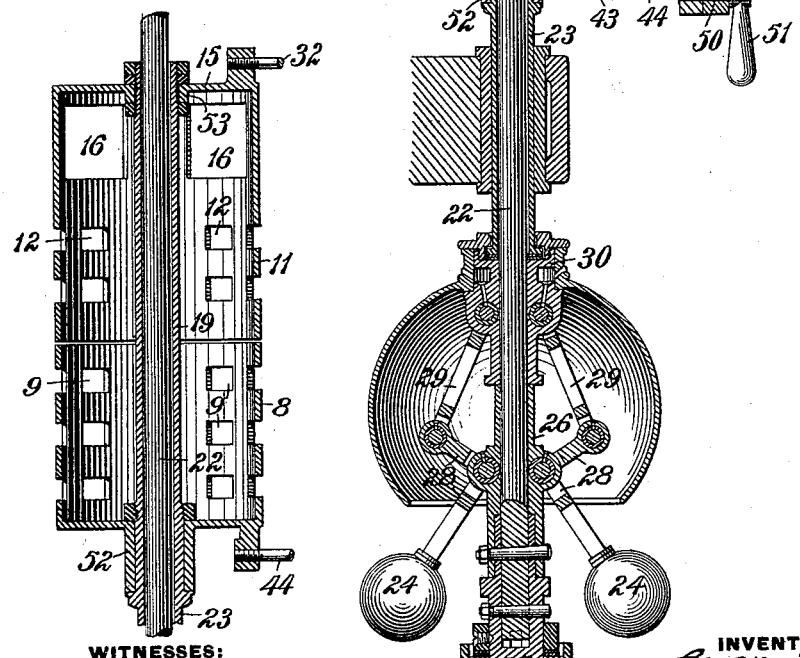
WITNESSES:
Chas. F. Miller.
T. J. Hogan.
INVENTORS.
Geo. Westinghouse Jr
Edwin Ruud,
By Mordrew Bell
Att'y.

(No Model.) 4 Sheets—Sheet 4.

G. WESTINGHOUSE, Jr. & E. RUUD.
MEANS FOR CONTROLLING AND REGULATING OPERATION OF GAS ENGINES.

No. 583,585. Patented June 1, 1897.

WITNESSES:
Chas. F. Miller.
F. J. Hogan.

INVENTORS
Geo. Westinghouse Jr.
Edwin Ruud
by Snowden Bell
Att'y

UNITED STATES PATENT OFFICE.

GEORGE WESTINGHOUSE, JR., AND EDWIN RUUD, OF PITTSBURG, PENNSYLVANIA.

MEANS FOR CONTROLLING AND REGULATING OPERATION OF GAS-ENGINES.

SPECIFICATION forming part of Letters Patent No. 583,585, dated June 1, 1897.

Application filed December 7, 1895. Serial No. 571,386. (No model.)

*To all whom it may concern:*

Be it known that we, GEORGE WESTINGHOUSE, Jr., and EDWIN RUUD, citizens of the United States, residing at Pittsburg, in the county of Allegheny and State of Pennsylvania, have invented or discovered a certain new and useful Improvement in Means for Controlling and Regulating the Operation of Gas-Engines, of which improvement the following is a specification.

The object of our invention is to provide improved means for controlling and regulating the operation of gas-engines; and to this end it consists in a novel regulating apparatus for effecting a mixture of the air and other gases and varying the capacity of or entirely closing the supply passage or passages through which air and other gases are supplied to the cylinder or cylinders of a gas-engine, whereby the mingling of the gases may be effected and the quantity and relative proportions of the air and other gases may be varied, and in certain combinations and features of construction, all as hereinafter fully set forth.

Figure 3:
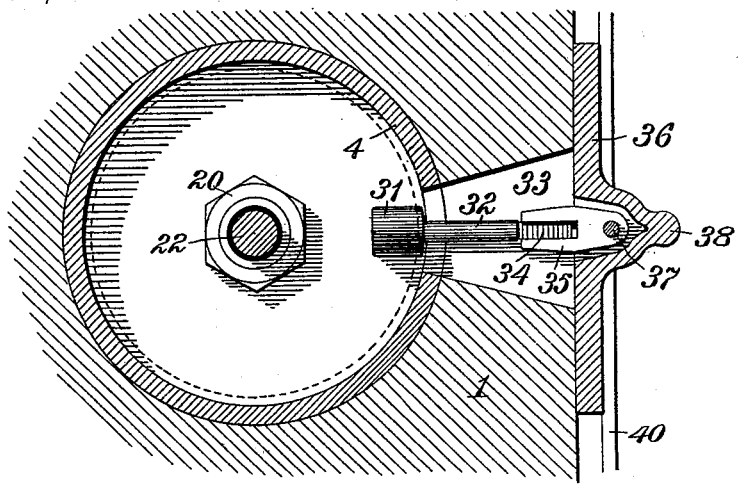
Figure 4:
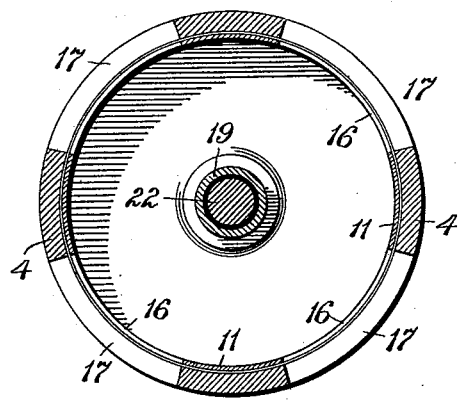
Figure 5:
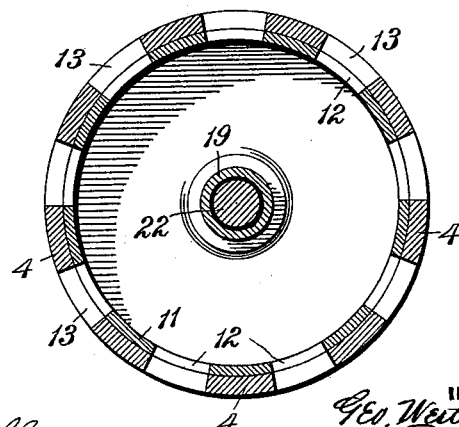
Figure 8:
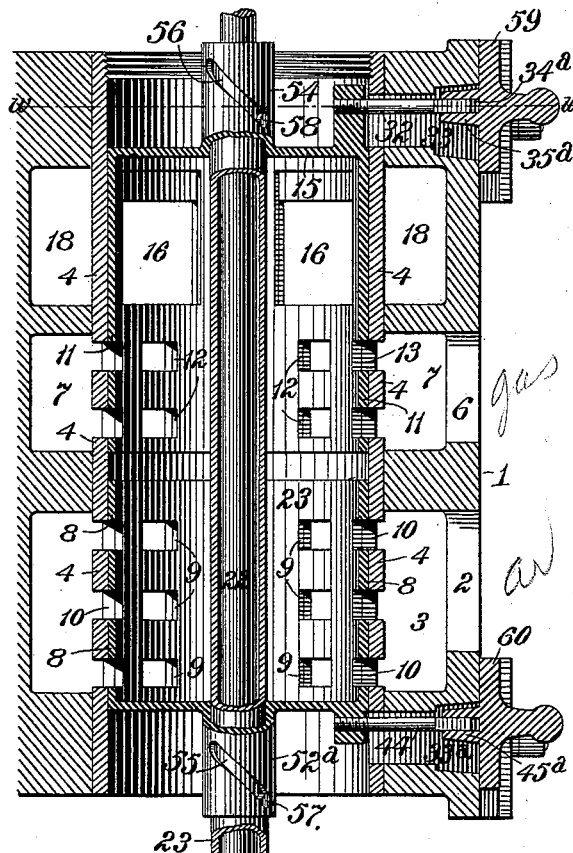
Figure 9:
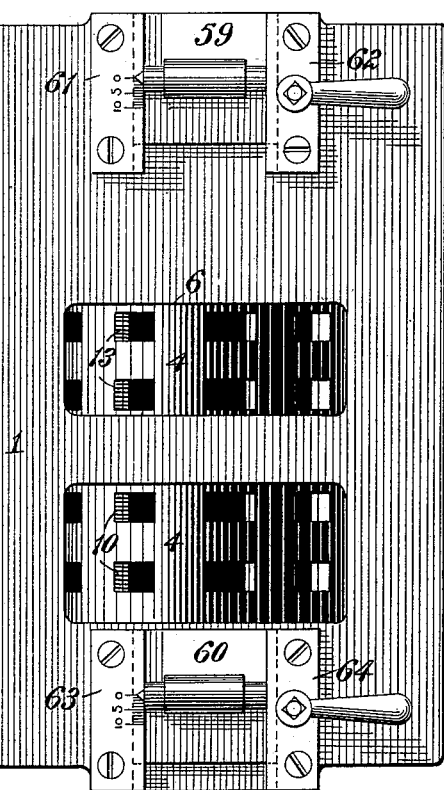

In the accompanying drawings, Figure 1 is a front elevation of the casing containing our improved valve apparatus; Fig. 2, a central longitudinal section through our improved valve apparatus; Figs. 3, 4, and 5, transverse sections on the lines $x\ x$, $y\ y$, and $z\ z$, respectively, of Fig. 2; Fig. 6, a central longitudinal section showing our improved valve apparatus in combination with an automatic governing device; Fig. 7, a central longitudinal section through the valve apparatus, showing a modification of the construction by which the valves are connected to the tubular stem; Fig. 8, a central longitudinal section through a modification of the valve apparatus in which rotary movement of the valves is effected by the governor and longitudinal movement by the hand-operated devices; Fig. 9, a front elevation of the casing of the valve apparatus shown in Fig. 8, and Fig. 10 a transverse section on the line $w\ w$ of Fig. 8.

As shown in Figs. 1, 2, 3, 4, 5, and 6, the casing 1 of our improved valve apparatus is provided with an air-supply port 2, which opens into an annular chamber 3, surrounding the bushing 4, which is fitted in the casing and incloses a chamber 5. A port 6, through which the other gases are admitted, opens into an annular chamber 7, surrounding the bushing 4. A valve 8 is fitted in the lower portion of the bushing 4 and is provided with ports 9, which are adapted to register with the ports 10 in the bushing for the purpose of admitting air from the annular chamber 3 to the interior of the valve 8. Above the valve 8 and bearing on its upper end or edge is a valve 11, which is fitted in the bushing 4 and provided with ports 12, which are adapted to register with ports 13 in the bushing for the purpose of admitting gas from the annular chamber 7 to the interior of the valve. The opposite ends of the valves 8 and 11 are closed by the heads 14 and 15, respectively, so as to form a perfectly-balanced valve device, and the interior chambers of the valves are at all times in open communication with each other and form a mixing-chamber, within which the air and other gases mingle after being admitted from the chambers or passages 3 and 7.

The valve 11 is provided near its upper end with large ports 16, which register with similar ports 17 in the bushing 4, and are at all times open to permit a free passage of the mixed air and other gases into the annular chamber or passage 18. The annular chamber 18 is at all times in open communication with the passage leading to the cylinder or combustion-chamber of the engine and which is controlled by the inlet-valve. (Not shown in the drawings.)

The valve 8 is rigidly secured to a central tube or sleeve 19, which extends upward through both of the valves 8 and 11, and is provided on its upper end with nuts 20 and 21, which limit or prevent upward movement of the valve 11 relative to the sleeve 19. The valve 11 is so fitted between the upper end of the valve 8 and the nuts 20 and 21 on the sleeve 19 that it may be rotated or partially rotated on the sleeve 19, but can be moved longitudinally only when the sleeve is so moved, and when the sleeve is moved longitudinally both valves are given the same movement, but either valve may be given a partial rotation independent of the other. It is not essential that the valve 11 should bear on the valve 8 or that their inner ends should be in contact with one another, but if preferred the sleeve 19 may be provided near its upper end with a collar or shoulder to form a bearing for the flange 53 on the head 15, as shown in Fig. 7, so that the valve 11 may be partially rotated on the sleeve 19 and moved longitudinally without direct contact with the valve 8.

Either of the valves 8 or 11 or the sleeve 19 may be so connected to a governing device that the valves may be moved longitudinally to vary the capacity of the ports 9, 10, 12, and 13, and thereby to vary the quantity of air and gas flowing through them, or to entirely close these ports; but our invention is not limited to any specific form of governor or connections therefrom for this purpose. In Fig. 6 of the drawings a centrifugal governor is shown as mounted on a shaft 22, extending through the sleeve 19, the governor being connected to the valves by means of a sleeve 23, which is moved longitudinally by the movement of the balls or weights 24. The shaft 22 is secured to and rotated by a shaft 25, which is operated from the motor and which imparts rotary motion to a sleeve 26 on the shaft 22. The sleeve 26 forms a bearing for the bell-cranks 28, to which the balls or weights 24 are secured, and has no longitudinal movement. The bell-cranks 28 are connected to the sliding head 30 by means of the links 29, and as the balls move outward or inward longitudinal movement is imparted to the sleeves 23 and 19 and to the valves 8 and 11 and the openings through the ports 9, 10, 12, and 13 are varied.

The valve 11 is provided on its upper end with a lug or projection 31, to which one end of an arm or pin 32 is secured. The arm or pin 32 projects into an opening 33 in the front part of the casing 1 and its outer end fits and is movable in a slot 34, formed in a pivoted arm 35. The arm 35 is pivotally connected by means of a pin 37 with a sliding plate 36, on the outer face of which is formed or secured a projection 38, by which the sliding plate may be moved by hand. The sliding plate 36 is fitted between the rabbeted guides 39 and 40, which are secured to the front of the casing 1, the guide 39 being permanently secured in place and fitted so as to permit the sliding movement of the plate, and the guide 40 being slightly concave on its inner surface, or the surface which bears on the casing 1, and provided with a clamping-screw 41, by which it may be clamped against the sliding plate 36 to prevent movement of the sliding plate. The outer end of the clamping-screw 41 is provided with a handle 42 for turning the screw, and when the handle is so turned as to relax the clamping action on the sliding plate the plate may be moved by means of the handle or projection 38.

When the sliding plate 36 is moved in either direction, the pivot-pin 37 and the outer end of the pivoted arm 35 move with it. The outer end of the arm or pin 32 is moved in the same direction and a partial rotation is given to the valve 11. The sliding plate may be moved so as to effect any desired opening of the ports 12 and 13 or to completely close them, but the motion of the valve should not be such as to materially affect the size of the opening through the large ports 16 and 17, through which the mixed gases pass out of the interior of the valve on their way to the cylinder.

The sliding plate 36 may be provided with a pointer, as shown, and the guide 39 may be provided with a graduated scale over which the pointer moves, so that the extent to which the ports 12 and 13 are opened may be indicated.

The valve 8, which controls the supply of air to the motor, is provided with a similar adjusting device for opening or closing the ports 9 and 10 or regulating the size of the opening through them by a partial rotation of the valve. The lower end of the valve 8 is provided with a lug or projection 43, to which is secured an arm or pin 44, the outer end of which projects into a recess or opening 33$^a$ and is fitted in a slot formed in an arm 45, which is pivotally secured to a sliding plate 46. The sliding plate 46 is fitted between guides 47 and 48 and is provided on its outer face with a projection or handle 49, by which it may be moved by hand, and the guide 48 is provided with a clamping-screw 50 and with a handle 51 for operating it. The guides, sliding plate, pivoted arm 45, pin 44, and clamping-screw 50, and their connections are substantially the same as those employed for operating the valve 11, and the valve 8 is operated by the movement of the sliding plate 46 in the same manner as the valve 11 is operated by the movement of the plate 36. It will be obvious that the sliding plates 36 and 46 may be operated by other means than that shown in the drawings, and that some other device, such as an adjusting screw or gearing, may be employed in connection therewith without departing from the spirit of our invention.

The partial rotation of the valve 8 by the movement of the plate 46 is independent of the movement of the valves by means of the governor and independent of the movement of the valve 11 by means of the plate 36, but, as shown in the drawings, since the sleeves 19 and 23 are rigidly connected with the valve 8 they are rotated with it. It will be obvious, however, that such a construction is not an essential feature of our improvement, as the sleeves 19 and 23 may be connected together or formed integral with one another, as shown in Fig. 7, and instead of being screw-threaded into the tubular extension 52 they may be smoothly fitted therein, as shown in Fig. 7, so that the valve 8 may be turned or partially rotated without necessarily turning the sleeve.

The recesses or openings 33 and 33$^a$, into which the arms or pins 32 and 44 project, and the slots in the pivoted arms 35 and 45 are of such dimensions as to permit the lateral movement of the arms or pins 32 and 44 therein and the longitudinal movement of the valves by the governor without obstruction or derangement of the connections.

By means of our improvement the supply of air may be regulated by adjusting the valve 8 by hand—that is, by moving the sliding plate 46 and giving a partial rotation to the valve 8—and the supply of other gases may be regulated in the same manner by moving the sliding plate 36 and giving a partial rotation to the valve 11, and the relative sizes of the openings through the valves 8 and 11, respectively, may be so adjusted as to secure any desired proportion between the quantities of air and other gases admitted to the cylinder or combustion-chamber of the motor.

Independent of the rotative adjustment of the valves the quantity of air and other gases will be controlled by the longitudinal movement of the valves, however such movement may be effected, without varying the proportions of the air and other gases. When longitudinal movement of the valves is controlled by means of an automatic governor, the supply of air and other gases will be regulated by and in accordance with the speed of the motor and according to the quantity required; but at any time and independent of the operations of the governor the proportions of the air and other gases may be varied by the movement of the sliding plates 36 and 46.

So far as the rotary adjustment of the valves 8 and 11 is concerned—that is, the adjustment by which the proportions of the air and other gases are regulated—the valves 8 and 11 operate as two separate valves, but in their longitudinal adjustment they operate and move together in the same manner as a single piston-valve. The dividing of the two valves or their formation in two separately-adjustable parts is for the purpose of varying the relative proportions of the air and gases, but without such division they form a single throttling and mixing valve, whereby the quantity of air and other gases is controlled, and their mixture is effected before passing to the cylinder or combustion-chamber of the motor.

Our improvement is not limited to a construction in which the proportions of the air and other gases are varied by a rotary movement of the valves, and the automatic throttling of both the air and gas is effected by a longitudinal movement, since the hand-operated devices, by which the valves are moved to vary the proportions, may be so connected to the valves as to move the valves longitudinally, and the connections between the valves and the governor may be such that the governor will effect rotary movement of the valves.

Figure 10:
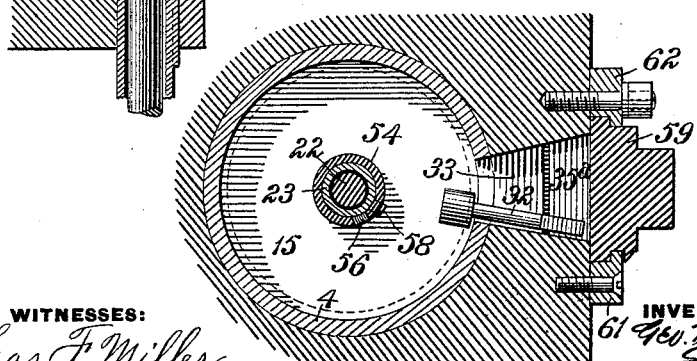

In Figs. 8, 9, and 10 is shown a construction in which the tubular stem or sleeve 23 of the governor passes through both valves 8 and 11 and is fitted to move in the tubular extensions 52 and 54 on the valves and to be moved longitudinally, so as to effect rotary movement of the valves. In this construction the tubular extensions 52 and 54 on the valves 8 and 11 are provided with inclined slots 55 and 56, and the pins 57 and 58, which are secured to the sleeve 23, project into these slots and effect rotary movement of the valves when the sleeve 23 is moved longitudinally by the governor.

The separate and independent movements of the valves for varying the proportions of the air and other gases are effected by means of the sliding plates 59 and 60, one of which is fitted between the guides 61 62 and the other between the guides 63 and 64, and both of which are adapted to be moved longitudinally to vary the size of the port-openings. The rod or pin 32, which is secured to the valve 11, extends into the recess or opening 33 in the casing, and its outer end is fitted in a slot $34^a$, formed in an extension $35^a$ of the plate 59. The form of the slot $34^a$ is such that it permits angular or rotary movement of the pin 32 therein, but does not permit longitudinal movement of the plate 59 relative to the pin 32 and valve 11. The sliding plate 60 is connected in the same manner by means of a slotted extension $45^a$ and a pin 44 with the the valve 8, and is adapted by a longitudinal movement to shift the valve 8 longitudinally to vary the size of the port-openings through which air is admitted.

With the construction shown in Fig. 8 it will be seen that when the valves are moved longitudinally by movement of the sliding plates 59 and 60 a rotative movement is also given to the valves. This is due to the slot-and-pin connection between the valves and the sleeve 23. If the ports are open, as shown in Fig. 8, both the longitudinal and rotative movements of the valves tend to close the ports.

Our invention provides means whereby the mixing-valve controlling the admission of air and other gases is automatically adjusted by the action of the governor, and this adjustment is effected without any substantial variation in the proportions of the air and other gases.

An important feature of our improvement is the relative or proportional variation of the port-openings by the governor, whereby for all adjustments substantially the same relative degree of opening or closing of the air and gas ports is effected, so that no matter how small the proportion of gas to air, for which the valve device is adjusted, the governor will not at any time entirely cut off the supply of gas, except when it also cuts off the supply of air—that is, when the proportion of gas to air is small and the valve device is moved by the governor to reduce the capacity of the air-port by any fraction the capacity of the gas-port will be reduced by a similar fraction. This is true for all proportions of air and gas, but it is of special importance where the proportion of gas to air is small.

We claim as our invention and desire to secure by Letters Patent—

1. The combination of a casing having an air-supply passage and a gas-supply passage, air and gas admission ports communicating with said passages, a valve device having an internal mixing-chamber receiving air and gas from said ports, and a governing device for operating the valve device which is adapted to automatically vary the capacity of the air and gas admission ports through which air and gas are admitted to the internal mixing-chamber, substantially as set forth.

2. In a regulating device for controlling the supply of air and other gases to a gas-engine, the combination, with air and gas supply passages, of a valve device controlling the air and gas supply ports, or passages, which is adapted to be adjusted in one direction to vary the quantity of air and other gases and in another direction to vary the proportions of the air and other gases, substantially as set forth.

3. In a regulating-valve device, for controlling the supply of air and other gases to a gas-engine, the combination, with air and gas supply passages, of two connected members, one controlling the supply of air and the other the supply of other gases, both adapted to be adjusted longitudinally to vary the quantity of air and other gases, and each adapted to be adjusted laterally to vary the proportions of the air and gases, substantially as set forth.

4. In a regulating-valve device, for controlling the supply of air and other gases to a gas-engine, the combination, with air and gas supply passages, of a cylindrical chamber, two connected cylindrical valves located and movable within the chamber, one controlling the supply of air and the other the supply of other gases, both adapted to be adjusted longitudinally and rotatively to vary the quantity and proportions of the air and other gases, substantially as set forth.

5. In a regulating-valve device, for controlling the supply of air and other gases to a gas-engine, the combination, with air and gas supply passages, of two connected, hollow, cylindrical members inclosing a mixing-chamber, one of the members controlling the admission of air and the other controlling the admission of other gases and both adapted to be adjusted to vary the capacity of the air and gas admission ports, substantially as set forth.

6. A hollow cylindrical valve device formed of two members which are connected together and inclose a mixing-chamber for air and other gases, ports controlled by one of the members for admitting air to the chamber, ports controlled by the other member for admitting the other gases to the chamber, ports or passages through which the mixed air and other gases may pass to the cylinder, or combustion-chamber of a gas-engine, an automatic governor connected to the valve device and controlling the supply of air and gas admitted to the mixing-chamber, and means whereby either or both members of the valve device may be adjusted to vary the proportions of the air and gas, substantially as set forth.

7. In a regulating-valve device, for controlling the supply of air and other gases to a gas-engine, the combination, with air and gas supply passages, of two connected members, one controlling the supply of air and the other the supply of other gases, both adapted to be adjusted in one direction to vary the quantity of air and other gases, and each adapted to be adjusted in another direction to vary the proportions of the air and gases, substantially as set forth.

8. In a regulating-valve device, the combination, of a cylindrical, rotatively-adjustable, valve, a sliding plate on the casing of the valve, a pivoted arm on the plate, and an arm which is connected to the valve and extends into a slot in the pivoted arm on the plate, whereby movement of the sliding plate may cause rotative movement of the valve, substantially as set forth.

9. In a regulating-valve device, for gas-engines, the combination of two hollow cylindrical valves which are closed at their outer ends and open at their inner ends, so as to form an inclosed mixing-chamber, air-admission ports controlled by one of the valves and gas-admission ports controlled by the other valve, a connection between the valves whereby they may be coincidently moved longitudinally, and mechanism connected to each of the valves whereby either may be rotated independently of the other, substantially as set forth.

10. The combination, of a casing having air and gas admission ports, and a valve device independent of the admission-valve of the engine having an internal mixing-chamber receiving air and gas from said ports, and adapted to automatically vary the capacity of the air and gas admission ports through which air and gas are admitted to the internal mixing-chamber, substantially as set forth.

11. In a regulating device for controlling the supply of air and other gases to a gas-engine, the combination, with a valve device which is adjustable to vary the proportions of the air and gas, and a governor for adjusting the valve device, of air and gas supply ports, or passages, the capacity of which may be varied by the movement of the valve device under the action of the governor, and which are so formed and arranged that adjustments of the valve device by the governor effect variations in the quantity only of the air and other gases without affecting their proportions, substantially as set forth.

12. In a regulating device for controlling the supply of air and other gases to a gas-engine, the combination, with air and gas supply passages, of a valve device controlling the air and gas supply ports, or passages, which is adapted to be adjusted in one direction to vary the proportions of the air and other gases, and in another direction by means of a governor to vary the quantity only of the air and other gases, substantially as set forth.

13. A regulating-valve device for controlling the supply of air and other gases to a gas-engine, which comprises a cylindrical chamber, two connected members located and movable within the chamber, one of which controls the admission of gas and the other the admission of air to the chamber, and an automatic governor connected to and adapted to operate both members to vary the capacity of the air and gas admission ports without varying the proportions of the air and gas, and thereby to control the quantity of air and other gases admitted to the chamber, substantially as set forth.

14. The combination, in a regulating device for controlling the supply of air and other gases to a gas-engine, of a mixing-chamber, two connected members movable within the chamber, one of which controls the admission of gas and the other the admission of air to the chamber, an automatic governor connected to and adapted to operate both members to control the quantity only of air and other gases admitted to the chamber, and means for adjusting each of the members to vary the proportions of the air and gas, substantially as set forth.

15. In a gas-engine in which the operation of the engine is regulated by varying the quantity of air and gas admitted to the cylinder, the combination, in a valve device which is independent of the admission-valve of the engine, of a mixing-chamber, separate ports for the admission of air and gas to the mixing-chamber, two connected members located and movable within the mixing-chamber, one controlling the admission of gas and the other of air to the chamber, a governing device connected to and adapted to operate both members to control the quantity only of air and gas admitted to the chamber, and means for separately adjusting each of the members to vary the proportions of the air and gas admitted to the chamber, substantially as set forth.

16. In a gas-engine, the combination, of a valve device, an internal mixing-chamber therein, normally open ports through which air and gas are admitted to the mixing-chamber, and a governor for operating the valve device to vary the capacity of the air and gas admission ports independently of the opening or closing of the main admission-valve of the engine, and without varying the proportions of the air and gas, substantially as set forth.

17. The combination, in a regulating device for gas-engines, of a mixing-chamber, a valve device concentric therewith which is independent of the main admission-valve of the engine, normally open air and gas admission ports through which air and gas are admitted to the mixing-chamber, and a governing device whose shaft is in line with the axis of the valve and which is adapted to automatically operate the valve to control the capacity of the air and gas admission ports, substantially as set forth.

18. In a regulating device for controlling the supply of air and other gases to a gas-engine, the combination, with air and gas supply passages, of a valve mechanism, controlling the air and gas supply ports, or passages, which is adapted to be adjusted to regulate the proportions of the air and other gases, and which is operative by a governor to vary the quantity of air and other gases admitted to the engine without variation of the proportions, substantially as set forth.

In testimony whereof we have hereunto set our hands.

GEO. WESTINGHOUSE, JR.
EDWIN RUUD.

Witnesses:
  A. G. HOLMES,
  A. L. McKAIG.